Aug. 26, 1947.   C. C. MORSE   2,426,231
AIR HEATER
Filed Sept. 6, 1945

-INVENTOR-
CARSON C. MORSE
BY Wade Koontz
-ATTORNEYS-

Patented Aug. 26, 1947

2,426,231

UNITED STATES PATENT OFFICE 2,426,231

AIR HEATER

Carson C. Morse, Miami, Fla.

Application September 6, 1945, Serial No. 614,800

3 Claims. (Cl. 219—39)

(Granted under the act of March 3, 1883, as amended April 30, 1928; 370 O. G. 757)

The invention described herein may be manufactured and used by or for the Government for governmental purposes, without payment to me of any royalty thereon.

This invention relates to improvements in heating structures and pertains particularly to improvements in air heaters.

The primary object of the invention is to provide a novel type of heating structure employing a heating unit with means provided for passing air through the heating unit to the point of distribution so that in its passage through the heating unit the air will be heated to the desired temperature.

Another object of the invention is to provide an air heater for a gyroscope installed in an aircraft which is so constructed as to prevent direct contact of air over the heating filaments of the heater, thereby eliminating the possibility of igniting gas fumes so commonly present in the airplane.

Another object of the invention is to provide a heating unit constructed in accordance with my invention which is simple in construction, efficient in operation, and which is particularly adaptable to heating air which is distributed over the moving parts of a gyroscope or similar instrument.

Considerable difficulty has been experienced in maintaining the gyroscope in aircraft in proper working condition. This is due partly to the formation of rust and corrosion of the moving parts of the gyroscope instrument. In relatively humid climates, a certain amount of moisture will settle upon the moving parts of the gyroscope when the aircraft is on the ground and, upon ascent of the aircraft into higher altitudes and consequently colder atmospheric conditions, the moisture will freeze and impair the efficiency of the moving parts of the gyroscope. Likewise, when an aircraft is flying at a high altitude and sudden descent is made, the gyroscope and its parts are usually cold, and upon contact of hot or even warm air, the point of condensation is easily reached, which results in steaming of the gyroscope glasses and also causing the parts to rust and corrode due to the formation of condensation vapors thereon.

With the above in view, it is proposed to construct an air heater particularly suitable for heating the moving parts of a gyroscope which will insure the flow of a stream of warm air over the moving parts of the gyroscope under all atmospheric conditions. It will be understood, however, that the device constructed in accordance with my invention can be utilized for directing a stream of warm air over the moving parts of any delicate instrument where, due to rust and corrosion of the parts, the efficiency of the instrument is impaired.

Still another object of the invention is to provide an air heater particularly adaptable for supplying warm air to the moving parts of a gyroscope which will also incorporate a means for filtering the air of any impurities before the air is heated to a given temperature and allowed to travel over the moving parts of the gyroscopic instrument.

The invention will be best understood from a consideration of the following detailed description taken in connection with the accompanying drawing forming part of the specification, with the understanding, however, that the invention is not confined to any strict conformity with the showing of the drawing but may be changed or modified so long as changes or modifications make no material departure from the salient features of the invention as expressed in the appended claims.

Figure 1:
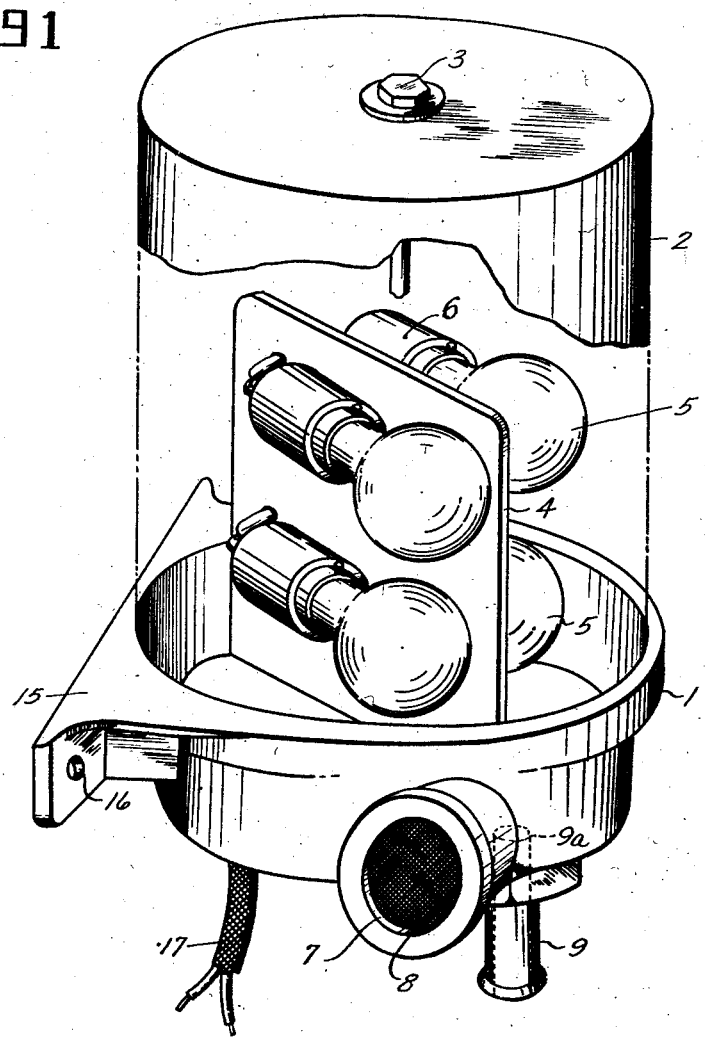
Fig. 1 is a perspective view of a device embodying my invention with parts broken and shown in dotted lines.

Referring now more specifically to the drawing wherein like numerals of reference designate corresponding parts throughout, the numeral 1 designates a base member, preferably circular in cross section, and a hollow cover member 2 is adapted to fit within a recess provided for in the base member and is held therein by means of a bolt member 3 which extends from the outside of cover 2 and engages the base member 1 mid-centrally thereof.

A baffle plate 4 is integral with or otherwise securely attached to the base member 1 and forms a support for light bulbs 5 carried in sockets 6 for a purpose more fully explained hereinafter. The baffle plate 4 forms a dividing means within the cover 2 with the sides thereof engaging the sidewalls of cover 2. The baffle extends from the base member 1 to a point adjacent to the top of cover member 2 and is located mid-centrally of the base.

Figure 2:
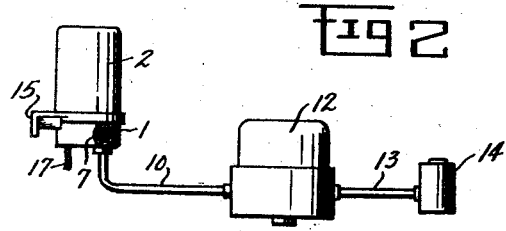
Fig. 2 is a view showing the air heater in relation to the gyroscope and pump mechanism.

Air is admitted within the cover 2 through an opening 7 provided in the inlet side of the base member. The air is filtered by means of a filter element 8 fitted within the opening 7. An air outlet 9a is provided for in the opposite or outlet side of the base 1 and is so located as to permit exit of air from within the cover 2 after same has been heated to the desired temperature. A nipple member 9 fits within the opening 9a previously referred to and is adapted to couple with a flexible conduit 10 which leads to the gyroscope instrument 12 and the gyroscope instrument 12 is connected to a vacuum pump 14 by conduit 13, as shown in Fig. 2. The base member 1 is provided with an off-set portion 15 provided with openings 16 through which may extend a bolt or other securing means for securing the heater in proper position. Electrical energy is supplied to the light bulbs 5 by means of an electrical conductor 17 which supplies electrical energy to the bulbs which are connected in series and which, when the device is in use, will heat the air entering into the cover member 2 for a purpose described more fully hereinafter.

In operation, the heater is secured to the instrument panel or other convenient place in the aircraft and is connected to the gyroscopic instrument and suction pump through flexible conduits as shown in Fig. 2 of the drawing. Air which is to be directed over the moving parts of the gyroscopic instrument is admitted into the cover member 2 through opening 7 and filter means 8. Electrical energy is supplied to the light bulbs 5 causing them to generate heat for warming the air entering into the cover. The air, as stated previously, is admitted through opening 7 and travels from the inlet side of the heating device to the outlet side thereof and during travel, is heated to the desired temperature. The baffle means directs the incoming air to the top of the cover member 2 before permitting same to be withdrawn through air outlet opening 9a whereby, during passage, the air will be heated and subsequently directed against the moving parts of the gyroscopic instrument. In this manner, the moving parts of the gyroscope are supplied with air having a relatively constant temperature, thereby avoiding any sudden rise or fall of the temperature of the air about the moving parts of the gyroscope, thus preventing the formation of dew condensation and steaming of the gyroscopic glass when the aircraft is in flight. As stated previously, my invention can be used for supplying warm air to the moving parts of any instrument and particularly to instruments which are subject to changes in atmospheric conditions which causes dew condensation thereon and eventual rust and corrosion of the parts, impairing the efficiency of the instrument.

Having thus described my invention what I claim as new and desire to secure by Letters Patent of the United States is:

1. A heating device for supplying heated air to a gyroscopic instrument comprising a base member provided with a recess therein, a hollow cover member adapted to fit within said recess, means extending through said cover member and being connected with said base member for securing same in assembled relation, a baffle member integral with and extending upwardly from said base member, said baffle member engaging the side walls only of said hollow cover member and ending slightly spaced from the top of the latter thereby forming a dividing means within said hollow cover member, supporting means on said baffle member for supporting heating means on both sides thereof, an air inlet in the inlet side of said base member, and an air outlet provided for in the outlet side of said base member for permitting the flow of air along both sides of the baffle member and the heating means thereon and from said cover member to the said gyroscopic instrument.

2. A heating device for supplying heated air to a gyroscopic instrument comprising a base member provided with a recess therein, a hollow cover member adapted to fit within said recess, means extending through said cover member engaging said base member for maintaining said cover within said recess, a baffle member integral with and extending from said base member, said baffle member contacting the side walls only of said cover member and forming a dividing means within said cover member mid-centrally thereof, means on said baffle for supporting electrical heating means, an air inlet in the inlet side of said base member, air filtering means within said air inlet, and an air outlet in the outlet side of said base member for permitting the flow of air from said heating device to the said gyroscopic instrument.

3. A heating device for supplying heated air to the moving parts of a delicate instrument comprising a base member provided with a recess therein, a hollow cover member adapted to fit within said recess, means extending through said cover member engaging said base member for maintaining said cover within said recess, a baffle member extending from said base member and engaging the side walls only of said cover and forming a dividing means within said cover member mid-centrally thereof, electric heating bulbs supported on both sides of said baffle member, an air inlet in said base member on one side of said baffle member, filtering means within said air inlet, and an air outlet in said base member on the opposite side of said baffle for permitting the flow of air from said heating device to the moving parts of a delicate instrument.

CARSON C. MORSE.

REFERENCES CITED

The following references are of record in the file of this patent:

UNITED STATES PATENTS

| Number | Name | Date |
|---|---|---|
| 1,416,225 | May | May 16, 1922 |
| 1,729,223 | MacVey | Sept. 24, 1929 |
| 711,827 | Cook et al. | Oct. 21, 1902 |
| 2,129,571 | Driscoll | Sept. 6, 1938 |

FOREIGN PATENTS

| Number | Country | Date |
|---|---|---|
| 121,448 | Great Britain | Dec. 19, 1918 |